March 13, 1962  S. H. A. THOMPSON  3,024,495
VACUUM FORMING MACHINES
Filed March 21, 1960

Inventor
STANLEY H.A. THOMPSON

By
Attorneys

United States Patent Office 3,024,495
Patented Mar. 13, 1962

3,024,495
VACUUM FORMING MACHINES

Stanley H. A. Thompson, Stoke Bishop, Bristol, England, assignor to Parnall & Sons Limited, a British company
Filed Mar. 21, 1960, Ser. No. 16,296
Claims priority, application Great Britain Apr. 9, 1959
4 Claims. (Cl. 18—19)

This invention has reference to vacuum forming machines of the kind wherein there is provided a movable platen incorporating means for heating and thereby soften a sheet of plastic material located over a mould or moulds in the machine so as to facilitate the forming of the sheet in the mould when a vacuum is established in the mould beneath the sheet.

The present invention resides in the incorporation in a vacuum forming machine of a heating platen pivotally mounted on arms pivotally mounted on the frame of the machine, and drive means coupled to the platen for rotating the platen from a substantially horizontal operative position overlying a mould in the machine to a substantially upright inoperative position with the heating side of the platen facing away from the mould as the arms are rotated to lift the platen from the mould.

Figure 1:
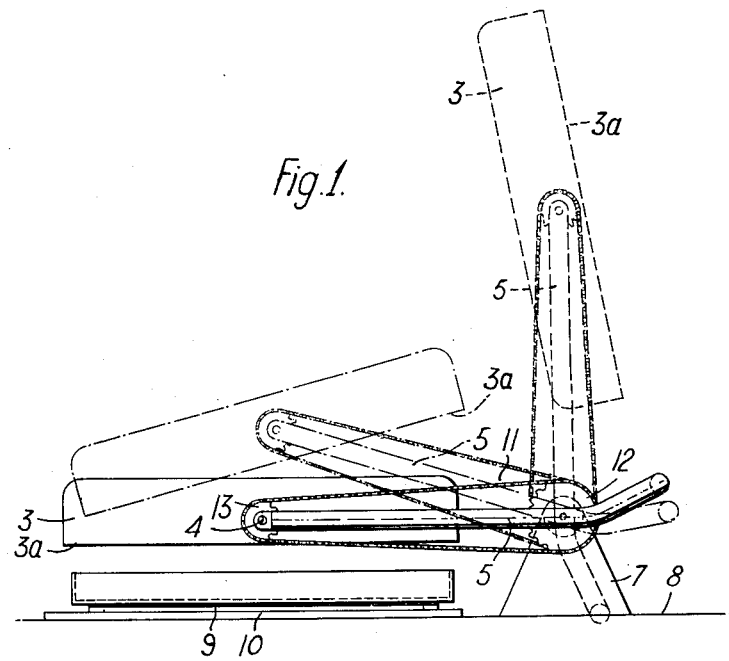
Figure 2:
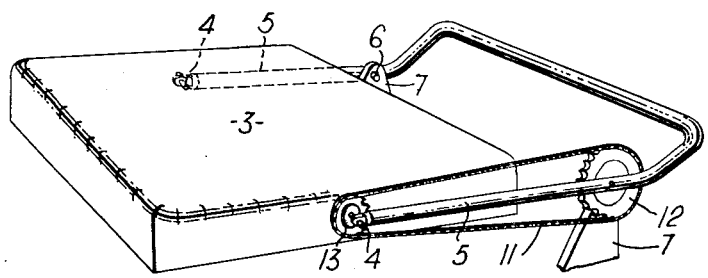

Preferred means for carrying the invention into practice is described by way of example only with reference to the accompanying drawings wherein:

FIGURE 1 is a side elevation showing the mounting according to the invention of a heating platen in a vacuum forming machine, and FIGURE 2 is a perspective view of the platen and its mounting seen in FIGURE 1.

As seen in the drawings the heating platen 3 is of a generally rectangular shape in plan having a heating element or elements mounted on the underside 3a of the platen in conventional manner. The platen 3 has a pair of co-axial trunnions 4 which are pivotally mounted for rotation about a horizontal axis on and adjacent to the free ends of a pair of arms 5 which in turn have trunnions 6 pivotally mounted about a common horizontal axis on upstanding brackets 7 mounted on the frame 8 of the machine, said axes of rotation being parallel. Thus by angular movement of the arms 5 the platen 3 can be bodily raised or lowered in relation to a sheet of plastic material 9 horizontally overlying a mould 10 mounted in the machine.

Fixed to one of the trunnions 4 on the platen 3 is a sprocket 13 which is connected by an endless chain 11 to a stationary sprocket 12 mounted co-axially with the axis of rotation of the arms 5. The gear ratio of the sprockets 12 and 13 is such that as the arms 5 and platen 3 are raised through 90° from a horizontal operative position shown in full lines in FIGURE 1 to an upright inoperative position shown in broken lines through the intermediate position shown in chain dotted lines, the platen 3 in addition to being bodily moved through 90° is also rotated by the chain 11 through 190° on its trunnions 4 so that the heating face 3a of the platen in its substantially upright position is directed away from the mould and operator instead of towards the mould and operator as would be the case if the platen 3 was rigidly mounted on the arms 5.

With the exception of the mounting of the heating platen 3 the remainder of the machine follows conventional practice and accordingly does not require description.

It will be seen that apparatus having a heating platen pivotally mounted as aforesaid provides the advantages that the heating platen 3 in its substantially upright inoperative position occupies a minimum of floor space, whereas in the conventional arrangement wherein the heating platen is mounted for sliding movement in a horizontal plane the platen in its waiting position occupies at least its own area of floor space; and secondly, as the platen is moved from its upright waiting position into its horizontal operative position above a plastic sheet the angular movement of the platen relative to the arms ensures that the plastic sheet is subjected to substantially less uneven heating than obtains in the conventional construction wherein the side of the plastic sheet nearest the platen receives appreciably more heat than the opposite side of the sheet.

I claim:

1. In a vacuum forming machine having a frame mounting an upwardly facing mould, a heating platen having an operative position over the mould wherein the heating face thereof is disposed facing substantially horizontally downwardly in overlying relation to the mould, arm means pivotally mounting said platen on the frame for moving said platen from said operative position to an inoperative position above the mould, means pivotally mounting said platen on said arm means on an axis spaced from the pivot of said arm means to said frame, and means automatically effective during pivotal movement of said arm means in moving said platen away from said mould for turning said platen about its arm means pivots until said platen heating face is disposed on the side facing away from said mould when said platen has reached said inoperative position.

2. In the machine defined in claim 1, said platen being turned through at least 180° during movement between said operative and inoperative positions.

3. In a vacuum forming machine having a frame mounting an upwardly facing mould, a heating platen having an operative position wherein the heating face thereof is disposed facing substantially horizontally downwardly in overlying relation to said mould, a pair of arms pivoted at one end on the frame, and means pivoting the platen between and to the other ends of said arms, means providing for rotation of said arms from a generally horizontal position which they occupy when the platen is in operative position to a generally upright position wherein the platen is in inoperative position, and means operative during said rotation of said arms for automatically turning said platen about its pivot on said arms until said heating face is disposed on the side facing away from the mould when the platen is in said inoperative position.

4. In the machine defined in claim 3, said means for turning the platen about its pivot on said arms comprising a first fixed sprocket on said frame coaxial with the pivot axis of said arms on the frame, a second sprocket mounted for rotation with the platen about the platen pivot axis on said arms, and a drive belt interconnecting said sprockets.

References Cited in the file of this patent

UNITED STATES PATENTS

| 2,702,411 | Winstead | Feb. 22, 1955 |
| 2,765,493 | Winstead | Oct. 9, 1956 |
| 2,781,078 | Dovidio | Feb. 12, 1957 |
| 2,907,069 | Butzko | Oct. 6, 1959 |

FOREIGN PATENTS

| 1,107,267 | France | Aug. 3, 1955 |